(12) United States Patent
Bistry et al.

(10) Patent No.: US 11,970,378 B2
(45) Date of Patent: Apr. 30, 2024

(54) WAREHOUSE INSPECTION SYSTEM

(71) Applicant: Jungheinrich Aktiengesellschaft, Hamburg (DE)

(72) Inventors: Hannes Bistry, Pinneberg (DE); Ralf Wetegrove, Norderstedt (DE); Maximilian Richter, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 347 days.

(21) Appl. No.: 17/190,568

(22) Filed: Mar. 3, 2021

(65) Prior Publication Data

US 2021/0276842 A1 Sep. 9, 2021

(30) Foreign Application Priority Data

Mar. 4, 2020 (DE) ...................... 10 2020 105 804.7

(51) Int. Cl.
*B66F 9/06* (2006.01)
*G01B 11/00* (2006.01)
*G05D 1/00* (2006.01)

(52) U.S. Cl.
CPC ............ *B66F 9/063* (2013.01); *G01B 11/002* (2013.01); *G05D 1/0225* (2013.01); *G05D 1/024* (2013.01)

(58) Field of Classification Search
CPC ...... B66F 9/063; B66F 9/0755; G01B 11/002; G01S 17/88; G01S 17/89; G01S 17/931; G05D 1/0225; G05D 1/024; G05D 2201/0216
See application file for complete search history.

(56) References Cited

U.S. PATENT DOCUMENTS 8,655,588 B2 2/2014 Wong et al.
2012/0235804 A1* 9/2012 Gilbride .............. B66F 9/07568
74/552

(Continued)

FOREIGN PATENT DOCUMENTS

WO 2019141929 A1 7/2019

OTHER PUBLICATIONS

European Application No. EP21159835.4, Extended European Search Report, dated Aug. 2, 2021, 9 pages.

(Continued)

*Primary Examiner* — Tyler J Lee
*Assistant Examiner* — Yufeng Zhang
(74) *Attorney, Agent, or Firm* — Kilpatrick Townsend & Stockton LLP

(57) ABSTRACT

Systems for inspecting a warehouse are disclosed. A system includes a laser scanner attachable to an industrial truck and adapted to scan in a plane substantially perpendicular to the industrial truck's main direction of travel to scan an environment of a warehouse on at least one side of the industrial truck and to generate scan data. The system includes a computing unit adapted to receive the scan data and data on the absolute position and/or relative position change of the industrial truck, or data from which one or more of these variables can be derived. The computing unit is further adapted to construct three-dimensional data of the environment on the basis of the scan data and data on the absolute position and/or relative position change of the industrial truck.

24 Claims, 7 Drawing Sheets

(56) References Cited

U.S. PATENT DOCUMENTS

| | | | |
|---|---|---|---|
| 2012/0303176 A1* | 11/2012 | Wong | G01S 17/89 |
| | | | 701/1 |
| 2018/0111810 A1* | 4/2018 | Magens | B66F 9/07559 |
| 2018/0155169 A1 | 6/2018 | Tanaka et al. | |
| 2021/0046650 A1* | 2/2021 | Deyle | G06Q 10/087 |
| 2021/0261337 A1* | 8/2021 | Schedlbauer | B65G 1/0492 |

OTHER PUBLICATIONS

Huber et al., "Using Laser Scanners for Modeling and Analysis in Architecture, Engineering, and Construction", 44th Annual Conference on Information Sciences and Systems, Mar. 2010, 6 pages.

* cited by examiner

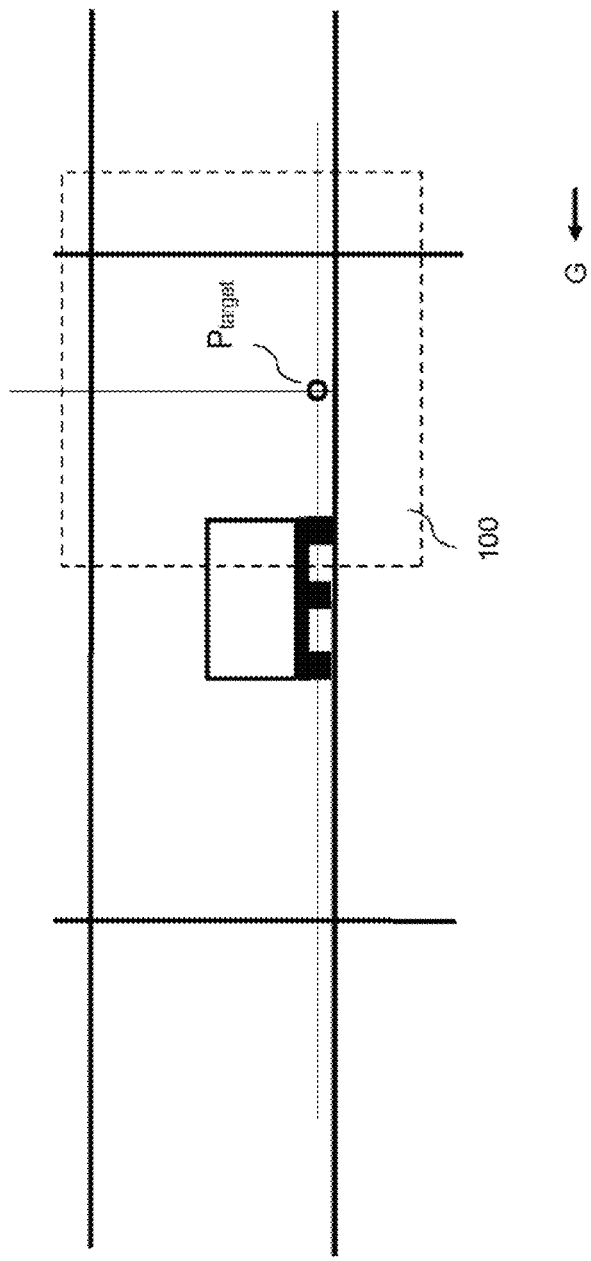

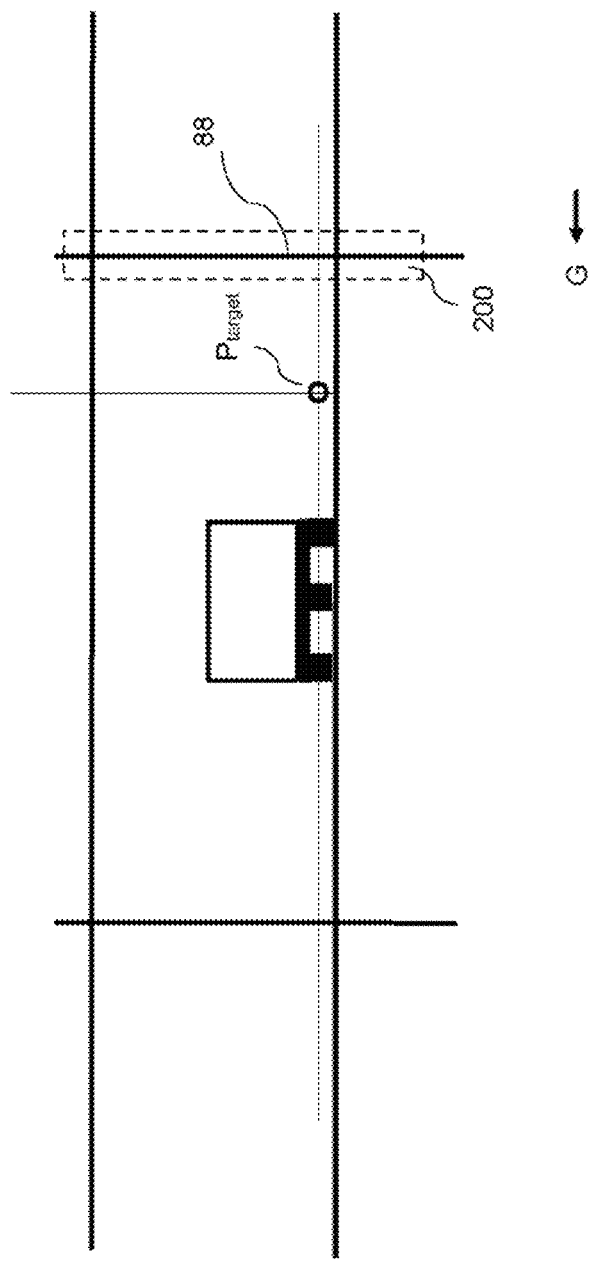

WAREHOUSE INSPECTION SYSTEM

CROSS REFERENCE TO RELATED APPLICATION

This application claims priority to German Patent Application No. 10 2020 105 804.7, filed in Germany on Mar. 4, 2020, the entire contents of which are hereby incorporated herein by this reference.

The present invention relates to a system for inspecting a warehouse, an industrial truck comprising such a system and a method for inspecting a warehouse using such a system.

For safety reasons, warehouse operators in many countries are legally obliged to inspect storage facilities, including racking systems, on a regular basis. In Germany, under the Occupational Health and Safety Act (Arbeitsschutzgesetz) and DIN EN 15635, a racking inspection should be carried out at least every 12 months. Early detection of damage or irregularities in racking systems helps not only to avoid serious accidents, but also to reduce repair costs and minimize system downtime. It is also particularly important for automated storage systems to deposit goods correctly in the right storage locations or to detect incorrectly deposited items at an early stage and correct them if necessary, so as to avoid logistics errors or disruptions in processes so that the automated systems concerned can work reliably.

A racking inspection is usually carried out by a skilled person, the skilled person usually conducting a visual inspection to compare the condition of the individual rack compartments (occupied, unoccupied), the contour of the individual deposited goods and the barcodes of the goods with corresponding data in a warehouse management system (WMS) and detecting any positioning errors of the goods in the rack (crooked, slanted, too far to the left or right), deformations of goods due to e.g. a yielding film wrapping and any damage to the rack (kink in a support, support at a crooked angle). The inspected storage condition is documented and, if the above-mentioned irregularities or damage are detected, appropriate measures are taken to re-establish a proper storage condition.

However, a manual inspection as described above is very labor-intensive, especially in the case of high-bay warehouses, which can include racks over meters high; moreover, automatic systems may not be allowed to operate while the inspection is taking place for safety reasons.

DE 10 2011 051 204 B3 discloses a method for the automated inspection of storage facilities using a special probe which has the shape of a storage aid used in the warehouse, such as a pallet, and includes optical and visual sensors for determining the distance from itself to the supporting structure of the storage facility and for measuring parameters of the surrounding area. To carry out the inspection, the probe must be moved by means of a goods transport device, such as a forklift, and, where necessary, introduced into individual storage bins. This means that either a goods transport device or a storage bin is occupied for the purposes of the inspection, hence they cannot be used for normal logistical tasks while the inspection is taking place.

DE 10 2016 122 485 A1 further discloses a method for providing the position of storage locations in a warehouse with an industrial truck, which has a positioning system and at least one lateral 3D camera, the viewing direction of which is aligned transversely to a main direction of travel. With the lateral 3D camera, image data of storage locations and the rack structure can be captured in the camera's field of view on one side of the industrial truck. However, a time-of-flight based 3D camera usually only has a limited field of view with an angle of approximately 60°. To detect racking on both sides of the truck at the same time therefore requires at least two 3D cameras, each mounted on one side of the industrial truck. Moreover, it is hardly possible to capture all storage locations of a multi-level rack at once with a lateral 3D camera in one measuring run. As a result, a large rack space may be only partially captured. Nor is it possible to capture data with compensation of the mast tilt of the industrial truck.

With automated driverless industrial trucks, as well as detecting storage irregularities or damage, it is also particularly important to ensure that positioning errors during deposit and retrieval operations can be detected in good time and corrected if necessary. US2018155169A1 discloses a method for capturing three-dimensional data of the environment by means of a laser scanner, wherein the laser scanner is fixedly attached to the fork of a forklift truck and scans the environment in front of the fork in a horizontal plane. The three-dimensional data of the environment are generated by the laser scanner moving up and down with the fork in a vertical direction while scanning the environment.

It is a task of the present invention to provide, according to the following aspects, an improved solution compared to the prior art for inspecting a warehouse, in particular an automated narrow-aisle high-bay warehouse, to enable reduced manpower costs, improved or alternative positioning control during deposit and retrieval operations, and early detection of damage and storage irregularities.

According to a first aspect of the invention, the task is solved by a system for inspecting a warehouse comprising: a laser scanner attachable to an industrial truck and adapted to scan in a plane substantially perpendicular to the industrial truck's main direction of travel in order to scan an environment of a warehouse on at least one side, preferably both sides, of the industrial truck and to generate scan data based thereon, a computing unit adapted to receive the scan data and data on the absolute position and/or relative position change of the industrial truck, or data from which one or more of these variables can be derived, the computing unit being further adapted to construct three-dimensional data of the environment on the basis of the scan data and data on the absolute position and/or relative position change of the industrial truck.

Laser scanners are electro-optical sensors that scan their environment by means of a rapidly rotating laser measuring beam, the measurement being based on the so-called time-of-flight (ToF) method. A commercially available laser scanner is usually adapted to scan the environment in one plane, with a pulsed laser beam that is deflected in different directions in the plane with the aid of a rotating mirror. A laser scanner has a significantly larger scanning angle compared to a ToF camera, with scanning taking place in a sector of up to 270° in the case of a commercially available laser scanner.

According to the invention, the laser scanner can be attached to the industrial truck in such a way that its scanning plane is essentially perpendicular to the industrial truck's main direction of travel. Thus, the environment can be scanned on at least one side, preferably both sides, of the industrial truck during the measuring run.

The laser scanner scans at a predetermined scanning frequency. In a continual process, a laser pulse is emitted after a certain angular step, triggering a single measurement. The data of the individual measurements are forwarded to the computing unit, the computing unit being adapted to construct three-dimensional data of the environment, creating a so-called point cloud representing a whole set of individual measurements.

Since the scanning plane is normal to the industrial truck's main direction of travel, data on the spatial position or direction of movement of the laser scanner are needed to construct three-dimensional data of the environment. Since the laser scanner can be fixedly attached to the industrial truck, the spatial position of the laser scanner results from the spatial position of the industrial truck, with the direction of movement of the laser scanner corresponding to the direction of travel of the industrial truck.

According to the invention, the computing unit is therefore further adapted to receive data on the absolute position and/or relative position change of the industrial truck, or data from which one or more of these variables can be derived. The relative position change of the industrial truck can be used not only to determine the absolute spatial position of the industrial truck, but also to determine the direction of movement of the industrial truck. The absolute position and/or relative position change of the industrial truck can be directly detected by existing or additional sensor systems for the localization of the industrial truck, such as optical sensors, RFID sensors or other sensors for localization or tracking purposes. Alternatively or additionally, the computing unit can receive data from which the computing unit can derive the absolute position and/or relative position change of the industrial truck. Such data may include, for example, odometry data of the industrial truck, which is explained in more detail below.

The vertical resolution of the point cloud is determined by the angular resolution of the laser scanner as well as the distance between the laser scanner and the object surface to be scanned, such as a rack front, the horizontal resolution being determined by the speed of travel of the industrial truck and the scanning frequency of the laser scanner.

In contrast to a movable probe, the laser scanner can be fixed to the industrial truck in such a way that it does not have to be carried specially for an inspection by the industrial truck with its load carrying apparatus, so that, with the present invention, the warehouse can be inspected both during the processing of transport requests and during periods with a low workload.

Manpower cost can be significantly reduced with the invention compared to a manual visual inspection of the warehouse. It also enables early detection of damage and storage irregularities, since, with the system according to the invention, inspections can also be carried out during the processing of transport requests and thus much more frequently. Deposit or retrieval operations can also be supported based on the generated three-dimensional data of a storage location or bin, whereby positioning errors or deviations can be detected in good time and corrected if necessary, thereby increasing the accuracy of deposit or retrieval operations. In this way, not only can the occupational safety of an automated warehouse be improved, but also the required safety distance between two adjacent stored loading aids in an automated warehouse can be reduced, so that even inventory warehouses can be automated without costly conversions.

As mentioned above, in a preferred embodiment, the computing unit is adapted to receive odometry data of the industrial truck, data on the absolute position and/or relative position change of the industrial truck being derived from the odometry data of the industrial truck. Odometry data of a vehicle include position and orientation data of the vehicle determined via its propulsion system. To determine the odometry data of a vehicle, measured variables from at least one wheel speed sensor in the chassis, a yaw rate sensor in, for example, an anti-lock braking system (ABS) or a vehicle dynamics controller (ESP), and a steering sensor for a steering wheel angle measurement are usually used. For track-guided vehicles, measured variables from the wheel speed sensor alone may be sufficient.

In another preferred embodiment, the laser scanner has scanning directions that include the two horizontal directions and the vertical upward direction. The laser scanner thus has a scanning angle of at least 180°, so that racking equipment on both sides of the industrial truck can be captured simultaneously with one measuring run. For high-bay warehouses, it is also important that the laser beam can also reach storage locations and storage structures on the upper levels of the high-bay racks. Therefore, the laser scanner is preferably set up in such a way that the scanning range can also include the environment above the laser scanner. The laser scanner is also preferably adapted to scan the floor of the racking equipment on both sides. In this way, the entire rack front of a rack can be captured with one measurement run.

In a further preferred embodiment, the computing unit is further adapted to detect individual storage elements from the constructed three-dimensional data of the environment. Storage elements in the context of this invention refer to all possible logistics elements or units that are used or required either for transport requests or for the storage of goods in a warehouse. They include stored goods such as merchandise or load units consisting of bundled merchandise or packages, storage aids such as pallets or containers, storage locations or bins, racks or racking elements such as vertical supports, horizontal supports, etc.

The computing unit is preferably adapted to recognize different storage elements from a constructed point cloud through image processing and to determine three-dimensional data of the individual recognized storage elements based on these. Image processing can take place either by segmenting the point cloud and then matching the individual segmented parts with predefined patterns or rules, or it can rely on an artificial intelligence method with learning capability, where the computing unit can be continuously trained with data to adapt to new environments.

The computing unit is also preferably adapted to receive data from a warehouse management system. A warehouse management system is a software-based system that manages the control of warehouse processes. Depending on the scope, various data can be stored in a warehouse management system which can be retrieved by external systems when required. They include data related to order management, logistics process management, such as management of deposit, retrieval or transfer operations, inventory management, master data management, etc. Data in the warehouse management system can be used for various purposes within the scope of the invention. For example, the computing unit can co-determine the spatial position of the laser scanner based on the data of a stock transfer request, or match the constructed data of the environment with the inventory data stored in the warehouse management system in order to check the warehouse inventory.

Furthermore, identification numbers of individual storage elements, such as racking equipment, storage locations or stored goods, can be saved in the warehouse management system so that, by combining it with other identification sensors, such as barcode or RFID readers, attached to the industrial truck, information relating to the detected storage elements can be retrieved by the warehouse management system and matched with the constructed data of the storage elements.

In a particularly preferred embodiment, the computing unit is further adapted to check a storage condition based on a comparison of the three-dimensional data of the individual detected storage elements with corresponding data from the warehouse management system. For example, as mentioned above, the number of detected stored goods or the number of storage locations still available can be compared with the corresponding numbers stored in the warehouse management system. The computing unit can also match positions, dimensions of the recognized storage elements and/or a distance between two adjacent storage elements with the corresponding master data from the warehouse management system.

The computing unit is further preferably adapted to check a storage condition based on a comparison of the three-dimensional data of the individual detected storage elements with predefined reference data. The reference data can be, for example, specific regulatory data defined by standards, such as the permitted deflection of a rack support, the permitted distance between two adjacent pallets stored in a high-bay warehouse, the permitted dimensions of a stored item, etc. The reference data can be saved either as master data in the warehouse management system or locally in a memory of the computer unit. The data can also be saved in another external store or in a cloud.

By comparing the three-dimensional data of the individual detected storage elements with the data stored in the warehouse management system or elsewhere, the computer unit can detect any storage irregularities and/or damage to individual storage elements.

The computing unit is preferably further adapted to document the storage condition and/or to output instructions based on the storage condition. The computing unit is preferably able to generate an electronic file with details of the warehouse inspection. When an irregularity or damage is detected in the warehouse, the computing unit can output an instruction to have a proper storage condition re-established either manually or automatically. For example, automatic transfer of a load with an automated industrial truck can be initiated if the computer unit has detected that a pallet has been stored in the wrong storage bin.

According to a second aspect, the invention relates to an industrial truck comprising a system according to the invention. The system according to the first aspect of the invention preferably serves as an extension of the industrial truck, the advantages of the industrial truck resulting from the advantages of the system.

In a preferred embodiment according to the second aspect of the invention, the industrial truck is a track-guided industrial truck. In order to increase the efficiency and transparency of logistics processes, automated storage systems are nowadays increasingly used, with an automated industrial truck forming the core of an automated storage system, being adapted to travel along a predefined track without manual intervention or with significantly reduced manual intervention and to automatically carry out logistics processes, such as deposit, retrieval or transfer. Use of the system according to the first aspect of the invention is advantageous for a track-guided industrial truck in particular, as it means that warehouse inspections can be fully automated. Furthermore, such an automated warehouse is made safer by the fact that the accuracy of automated logistics operations can be enhanced by the constructed three-dimensional data of the environment. Since the lane is already predefined, the odometry data of the industrial truck can be determined solely on the basis of measurement data from wheel speed sensors.

In another preferred embodiment according to the second aspect of the invention, the industrial truck comprises a mast, the laser scanner being fixed to an attachment of the industrial truck that is directly or indirectly movably connected to the mast, the height of the laser scanner being adjustable in relation to the driving surface with a work function of the industrial truck.

The mast is the core part of a truck which is adapted to perform a work function such as lifting or lowering a load, the mast being associated with a plurality of attachments which are movable up and down the mast with a work function. The work function may also include a mast tilt function by which the entire mast can be tilted by an angle defined by the work function. Thus, the relative position of the laser sensor with respect to the truck's vehicle body can be adjusted by fixing it to one of the movable attachments of the truck likewise by means of a work function of the truck. The relative position of the laser scanner with respect to the truck's vehicle body can, if necessary, be determined by an additional work function of the truck, without having to carry out a separate measurement, although this would of course also be possible as an alternative.

The industrial truck is preferably a high-bay stacker, comprising an operator's station with an overhead guard and/or a load carrying apparatus that can be moved laterally back and forth, transverse to the truck's straight-ahead direction of travel, the laser scanner preferably being fixedly attached to the overhead guard or to the load carrying apparatus. The high-bay stacker is preferably adapted to deposit a load in a rack or to retrieve a load from a rack in a narrow aisle between racks of a high-bay warehouse and preferably comprises a multi-part telescopically extendable mast to which the operator's station with overhead guard and/or the swiveling load carrying apparatus is assigned, an operator's station not necessarily having to be present in the case of an automated high-bay stacker. Thus, the relative position of the laser scanner in relation to the body of the high-bay stacker can be adjusted with a work function of the high-bay stacker. In addition, both the overhead guard and the load carrying apparatus have locations where the laser scanner has a view of both the left and right racking levels and there is no impairment of the work function.

With the integrated system for inspecting the warehouse according to the first aspect of the invention, the process control of the narrow-aisle high-bay stacker can be optimized, resulting in several advantages: The required safety distance between two adjacent stored loading aids in a high-bay warehouse served by an automated high-bay stacker can be reduced from currently 100 mm to 75 mm. This means that even inventory warehouses can be automated and optimized without costly conversions. A positioning error, e.g. due to floor unevenness or deformation of the racking structures, can be compensated for during the execution of a transport request. Hence, it is no longer necessary to teach-in all the rack compartments beforehand, thereby greatly reducing the set-up effort for a high-bay warehouse. Moreover, as already mentioned, irregularities or damage to a high-bay warehouse are detected at an early stage, thus enhancing occupational safety and logistical efficiency.

In a third aspect, the present invention relates to a method for inspecting a warehouse by means of a system according to the invention, the system optionally being assigned to an industrial truck according to the invention, comprising the following: scanning the environment and generating scan data; capturing data on the absolute position and/or relative position change of the industrial truck, or data from which one or more of these variables can be derived; constructing three-dimensional data of the environment on the basis of the scan data and the odometry data of the industrial truck. The advantages of the method correspond to the advantages of the system according to the first aspect of the invention.

The method preferably further comprises: capture of odometry data of the industrial truck, data on the absolute position and/or relative position change of the industrial truck being derived from the odometry data of the industrial truck.

In a preferred embodiment according to the third aspect of the invention, the method further includes automatic activation of the system when a reference point is recognized. For example, the system for inspecting a narrow-aisle high-bay warehouse associated with a high-bay stacker can be activated automatically when the high-bay stacker enters a narrow aisle of the high-bay warehouse, provided that a reader attached to the high-bay stacker has detected a reference point at the entrance area of the narrow aisle, the reference point being identifiable, for example, by a barcode attached to a side of the rack or an RFID transponder embedded in the floor. On leaving a narrow aisle, the system can be switched off again in a similar way.

The method preferably further includes detection of the current spatial position of the laser scanner, for example based on externally input data and/or reference points detected by the laser scanner, the method further constructing three-dimensional data of the environment based on the spatial position of the laser scanner. Although the laser scanner is fixedly attached to the industrial truck, the relative position of the laser scanner with respect to the body of the industrial truck can, as mentioned above, be changed by means of a work function of the industrial truck, which work function may include lifting a load to a certain height, lowering a load to a certain height, tilting of the mast of the industrial truck with a certain angle of inclination, a side-shifting function of the load carrying means of the industrial truck and/or a swiveling of the load carrying means of the industrial truck. The externally entered data include, for example, data from a warehouse management system that precisely define the work function. Moreover, the external environment can also influence the spatial position of the laser scanner, for example in the form of ground unevenness, which can be detected by means of existing or additional sensors. Additionally or alternatively, reference points, such as a barcode, RFID transponder or image marker, can also be set up in the environment that comprise or represent specific spatial information, the reference points being detected either by the laser scanner or by other sensors and also being able to co-determine the spatial position of the laser scanner.

In a preferred embodiment according to the third aspect of the invention, the method further includes detection of individual storage elements from the constructed three-dimensional data of the environment.

In a further preferred embodiment according to the third aspect of the invention, the method further includes reception of data from a warehouse management system.

The method according to the third aspect of the invention preferably further includes inspection of a storage condition based on matching the three-dimensional data of the individual detected storage elements with corresponding data from the warehouse management system.

In another preferred embodiment, the method further includes inspection of a storage condition based on matching the three-dimensional data of the individual detected storage elements with predefined reference data.

The method preferably further includes detection of damage and irregularities of the storage condition.

In a further preferred embodiment, the method further includes the output of instructions based on the storage condition and, if necessary, re-establishing a proper storage condition, the storage condition being re-established either automatically or manually.

As mentioned above, the method can be carried out during the processing of transport requests as well as during periods of low workload in dedicated runs. In a preferred embodiment, the method is carried out during a deposit or retrieval operation. The method can thus be used to support the deposit or retrieval operation. The deposit or retrieval operation can be carried out using the method in a two-stage process, wherein the industrial truck first travels forwards or backwards past a target rack compartment and thus captures three-dimensional data of the rack compartment and/or corresponding storage elements in relation to the rack, such as a rack support, and only then carries out a deposit or retrieval operation, if necessary with correction of the positioning of the load-carrying means of the industrial truck. In this way, both occupational safety and the accuracy of an automated industrial truck's positioning control can be significantly enhanced during deposit and retrieval operations.

The invention is explained in more detail below based on preferred exemplary embodiments with reference to the accompanying drawings.

DESCRIPTION OF DRAWINGS

FIG. 6 A schematic diagram illustrating a deposit strategy used in conjunction with the exemplary embodiment of FIG. 1.

FIG. 7 A schematic diagram illustrating another deposit strategy used in conjunction with the exemplary embodiment of FIG. 1.

FIG. 1 shows a side view of an exemplary embodiment of an industrial truck 1 with a system for inspecting a warehouse according to the invention, in which exemplary embodiment the industrial truck is a high-bay stacker designed as a trilateral forklift.

Figure 1:
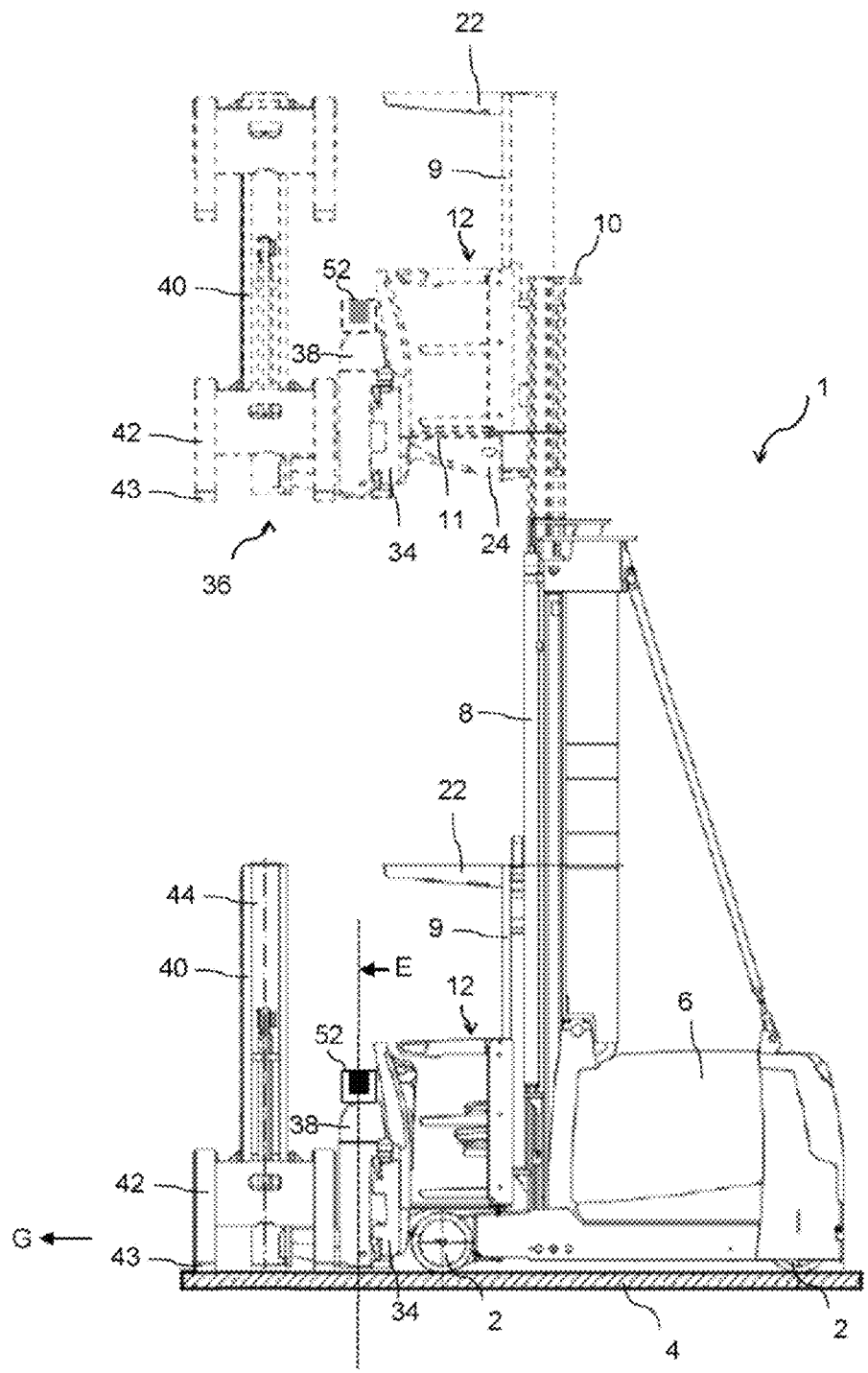
FIG. 1 A side view of an exemplary embodiment of an industrial truck with a system for inspecting a warehouse according to the invention.

The industrial truck 1 has wheels 2 mounted on wheel suspensions, not shown, which stand on the driving surface 4. The wheel suspensions are in turn attached to a vehicle body 6 to which an upright-mounted mast 8 is also attached. The mast 8 is designed to be telescopically extendable in multiple parts, as illustrated in FIG. 1 by the extended position shown with dotted lines. On the furthest extendable telescope stage 10 of the mast 8, a vertically movable support structure 9 is attached to support the operator's station. The support structure 9 has a cantilever arrangement 24 projecting forward from the mast 8 in the main direction of travel G of the industrial truck as a jib supporting a platform 11 of an operator's station 12 on its underside and carrying a side shift frame 34 at its projecting end.

The operator's station 12 is designed as a liftable operator's cab, whose frame has a rear wall, side walls and overhead guard 22, with the operator's station platform 11 forming the cab floor. The side shift frame 34 is attached to the cantilever arrangement 24 in front of the operator's station 12 viewed in the main direction of travel G. The side shift frame 34 is part of a load-carrying assembly 36, known per se, which further comprises a side shift device 38 disposed on the side shift frame 34 so as to be movable laterally, transverse to the truck's straight-ahead direction of travel G, in the form of a swivel push device 38 with an additional mast 40 arranged in front of it, on which a load-carrying fork 42 with a fork-carrier arrangement is vertically movable as a load-carrying element. The additional mast 40 can be swiveled together with the load carrying fork 42 about the vertical axis 44 between the position shown in FIG. 1, with lateral alignment of the load carrying fork 42 or its load carrying tines 43 (transverse alignment to the left in relation to the straight-ahead direction of travel G), and a position with opposite lateral alignment (transverse alignment to the right) of the load carrying tines 43.

All work functions associated with the mast 8 and the load carrying assembly 36 are operable by means of a hydraulic unit, not shown.

The industrial truck 1 includes a system for inspecting a high-bay warehouse, the system comprising a laser scanner 52 and a computing unit 60, not shown in FIG. 1. The system preferably serves as an extension of the industrial truck, wherein the computer unit 60 can either be assigned to an already existing on-board computer of the industrial truck 1 or can be provided by a separate computer system. The laser scanner 52 is fixed to the industrial truck, preferably to an attachment that is directly or indirectly movably connected to the mast 8, the height of the laser scanner 52 being adjustable in relation to the driving surface 4 with a work function of the industrial truck 1. The laser scanner 52 is preferably fixed on top of the side shift device 38. Alternative locations such as the overhead guard 22 are also suitable for mounting the laser scanner 52. The laser scanner 52 is adapted to perform a scan in a plane E substantially perpendicular to the industrial truck's main direction of travel G.

Figure 2:
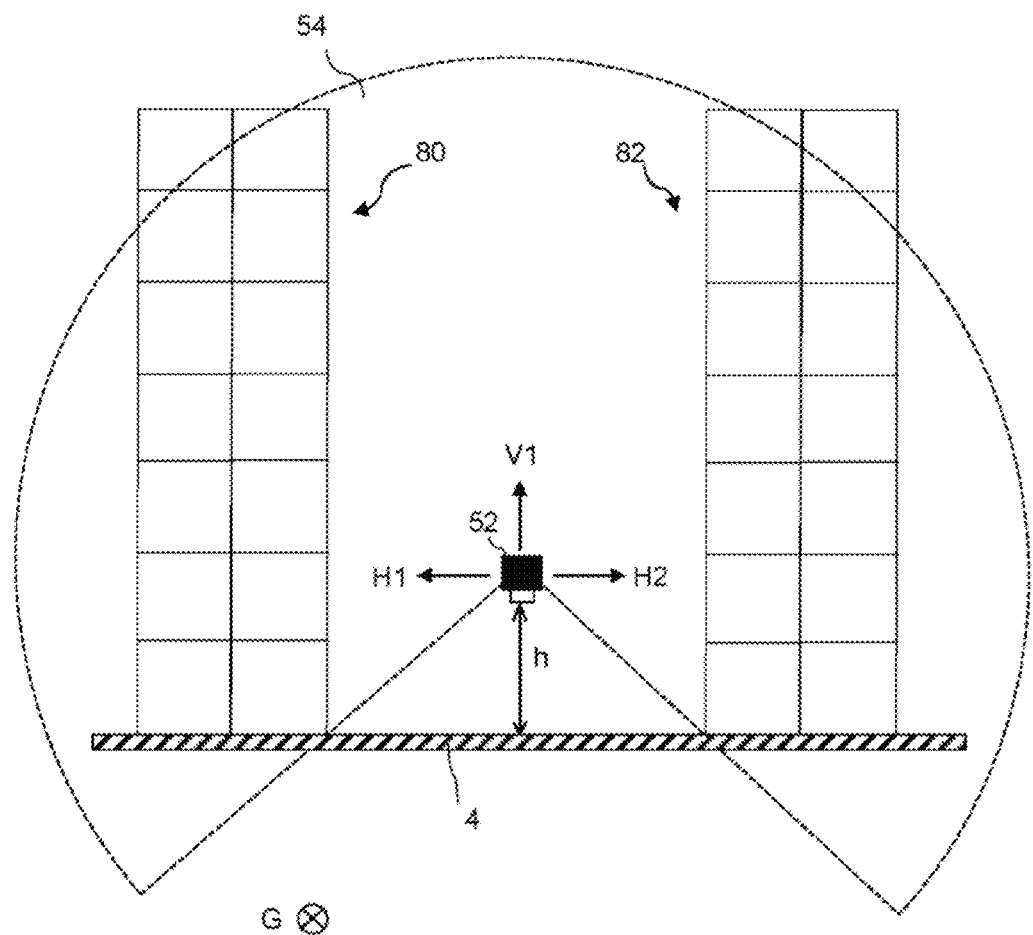
FIG. 2 A schematic diagram of the scanning plane of the laser scanner from FIG. 1.

FIG. 2 shows the scanning plane E of the laser scanner viewed in the industrial truck's main direction of travel G. The laser scanner 52 preferably has a continuous scanning range 54 of more than 180° and is currently positioned at a certain height h in relation to the driving surface 4 such that the scanning directions of the laser scanner 52 comprise the two horizontal directions H1 and H2 and the vertical upward direction V1. This means that rack fronts of racks 80 and 82 on both sides of the industrial truck 1 can be captured with a single measuring run. Furthermore, the scanning beam of the laser scanner 52 can reach rack fronts from the rack floor to the highest levels of racks 80 and 82, so that all storage locations on both sides of the lane can be detected at once. The system can therefore be particularly advantageous and time-saving, for example when conducting an inventory of a warehouse or inspecting the occupancy status of storage locations.

Figure 3:
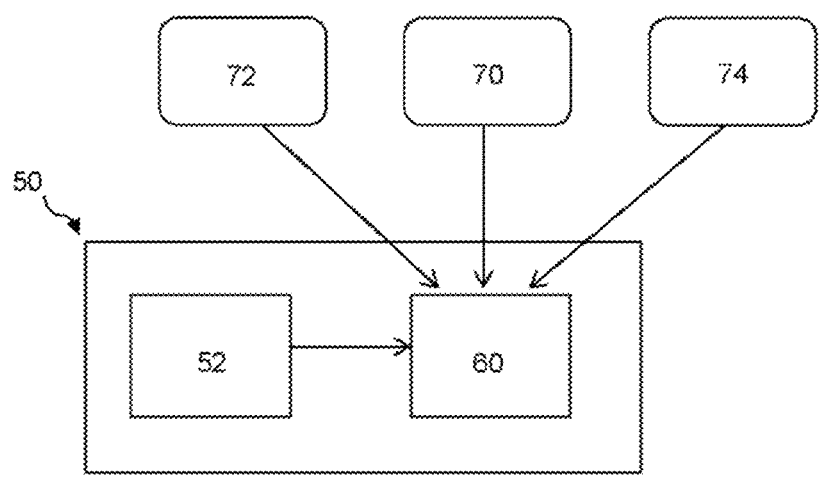
FIG. 3 A schematic diagram of the components provided for the inspection of a warehouse with the exemplary embodiment of FIG. 1.

FIG. 3 contains a rough schematic diagram illustrating the structure of the system 50 for inspecting a warehouse that is used in the industrial truck 1 shown in FIG. 1. The system 50 includes the laser scanner 52 and the computing unit 60, the laser scanner 52 being disposed to scan the environment in order to generate scan data, and the computing unit 60 being disposed to receive the scan data and construct three-dimensional data of the environment based on these. Since the scanning plane E is perpendicular to the industrial truck's main direction of travel G, data on the spatial position or direction of movement of the laser scanner 52 are additionally needed to construct three-dimensional data of the environment. According to the invention, the computing unit 60 is disposed to receive odometry data of the industrial truck 70, the odometry data of the industrial truck 70 comprising position and orientation data of the vehicle, which can preferably be determined by means of its propulsion system.

Since the laser scanner 52 is fixedly attached to the industrial truck 1, the direction of movement of the laser scanner 52 results from the direction of travel of the industrial truck 1 and thus directly from the odometry data of the industrial truck 70. In order to determine the spatial position of the laser scanner during scanning, other data may be relevant and consulted in addition to the odometry data 70.

Since the laser scanner 52 is preferably fixedly attached to an attachment of the industrial truck 1 that is directly or indirectly movably connected to the mast 8, the height of the laser scanner h in relation to the driving surface 4 can be adjusted with a work function, for example the lifting or lowering of a load carrying element of the industrial truck 1. Furthermore, the horizontal position of the laser scanner can also be changed by means of a work function, for example the swiveling of a load carrying element. This means that the relative position of the laser scanner 52 changes with respect to the body 6 of the industrial truck 1. Data 72 corresponding to the work function with respect to, for example, the positioning data of an attachment can be obtained, for example, from a control unit of the industrial truck and/or from a warehouse management system and are preferably used when determining the spatial position of the laser scanner 52.

Further data 74, for example relating to environmental influences such as ground unevenness or reference data for the localization of the industrial truck, can also be relevant for the determination of the spatial position of the laser scanner, such further data 70 being obtainable with various pre-existing or separately added sensor-based solutions.

Figure 4:
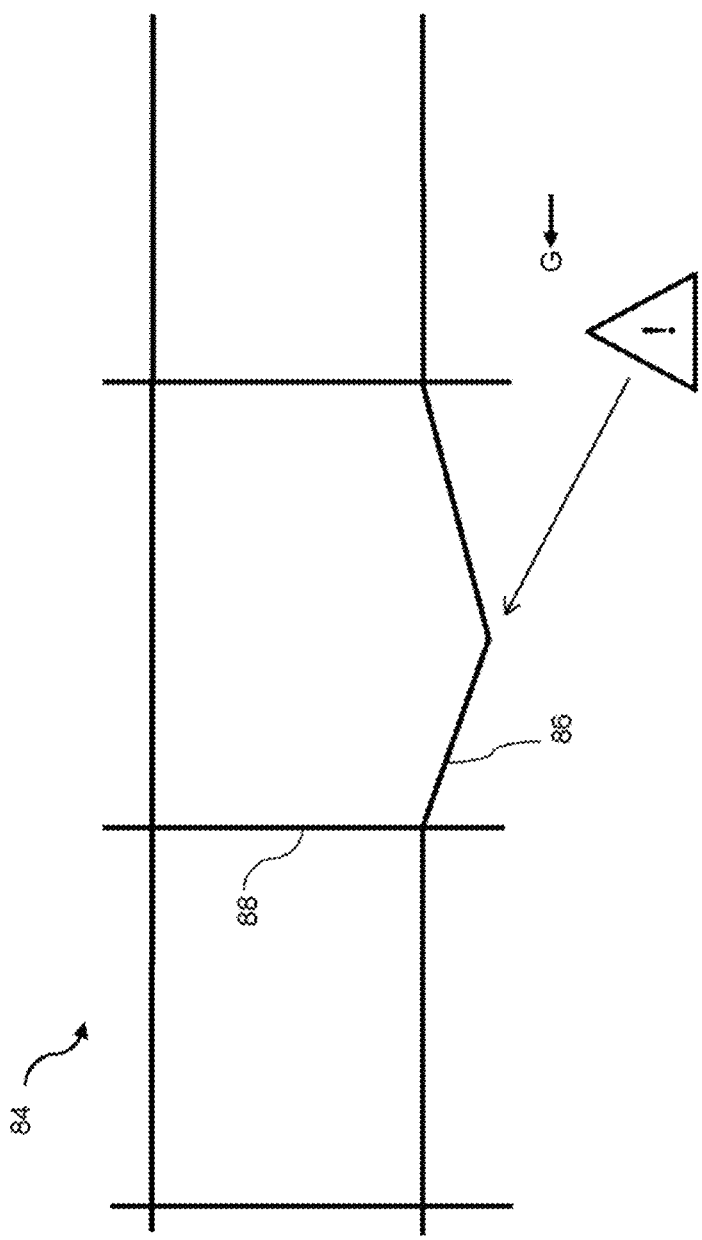
FIG. 4 A schematic diagram illustrating the detection of damage in a warehouse using the system in FIG. 1.
Figure 5:
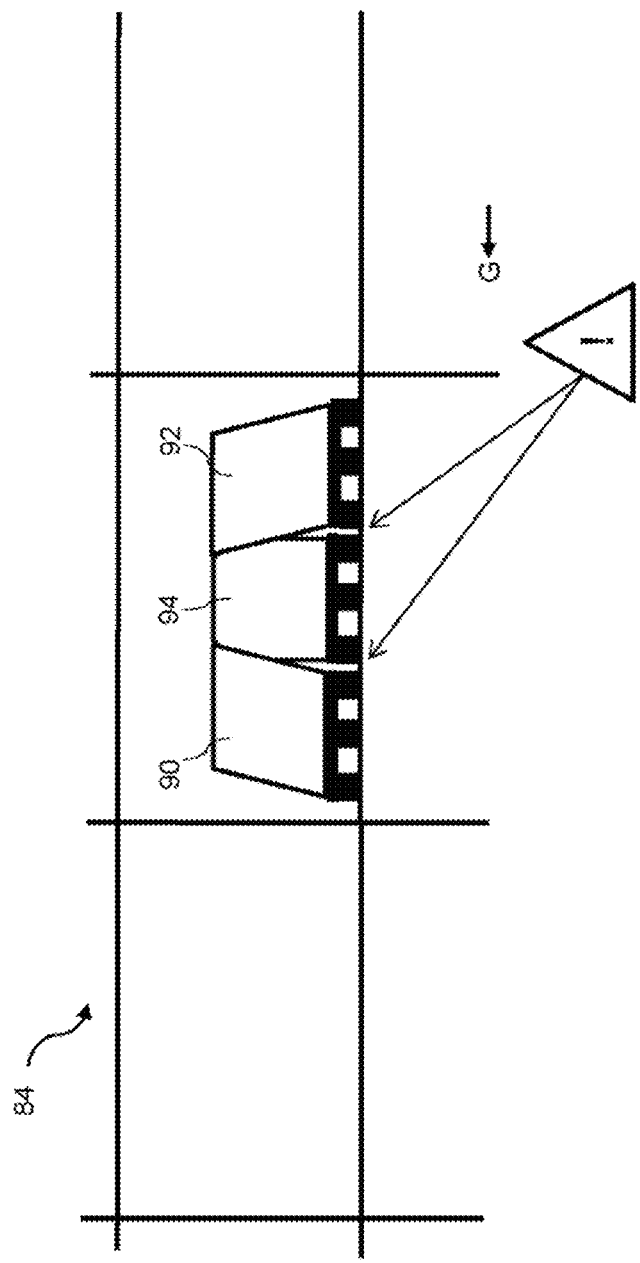
FIG. 5 A schematic diagram illustrating the detection of an irregularity in a warehouse using the exemplary embodiment of FIG. 1.

Based on the scan data, the odometry data of the industrial truck and possibly other data mentioned above, the computing unit 60 constructs three-dimensional data of the environment in the form of a point cloud. Through suitable image processing, the computing unit 60 can recognize various storage elements from the constructed point cloud and, based on these, determine three-dimensional data of the individual recognized storage elements. Based on a comparison of the three-dimensional data of individual detected storage elements with corresponding data from the warehouse management system and/or with predefined reference data, the computing unit 60 is able to automatically detect damage or irregularities in a warehouse. FIG. 4 and FIG. 5 each illustrate an example of this.

FIG. 4 shows part of a rack 84 comprising a plurality of horizontal supports 86 and vertical supports 88. It can be seen in FIG. 4 that rack damage has occurred in the form of a deformed horizontal support 86. When the industrial truck 1 with the system 50 passes the affected storage area, the computing unit 60 is able to recognize, from the constructed point cloud and corresponding image processing algorithms, that the horizontal support 86 is deformed. Based on this, the computing unit 60 can output an instruction to have the horizontal beam 86 repaired or replaced.

FIG. 5 also shows part of a rack 84 with horizontal supports and vertical supports. It can be seen from FIG. 5 that two deposited load units 90 and 92 are deformed in such a way that the load unit 94 is compressed by the other two and has also been deformed as a result. If the load unit 94 were to be retrieved by an automated industrial truck without taking this irregularity into account, in the worst case the resulting frictional force could cause the adjacent load units 90 and 92 to fall out of the rack, resulting in an accident.

However, with the solution according to the invention, this irregularity can be detected before the load unit 94 is retrieved, thereby avoiding a potential accident. When the industrial truck 1 with the system 50 passes the storage area concerned, the computing unit 60 is able to detect that the distance between load units 90 and 94 and the distance between load units 92 and 94 is below a predefined, permitted reference value, which is stored in the warehouse management system, for example. When these irregularities are detected, the computing unit 60 will output an appropriate instruction so that the load unit 94 is not retrieved until this irregularity has been rectified.

FIG. 6 schematically illustrates a deposit strategy used in conjunction with the exemplary embodiment of FIG. 1. The industrial truck 1 preferably receives a transport order from a warehouse management system, which specifies the destination storage location where a load is to be deposited. Based on this, a navigation system of the industrial truck guides the industrial truck 1 to a target position, the load carrying fork 42 of the industrial truck also being set, if necessary, to a target position by a control system of the industrial truck, so that the load can be deposited in the target storage location.

Before the industrial truck reaches the target position, the warehouse inspection system 50 is preferably activated and the speed of the industrial truck is reduced, if necessary, so that the target storage location can be scanned when the industrial truck passes the target storage location in direction G, and three-dimensional data of the target storage location can be constructed based on this. The scanning range 100 is marked by dashed lines, the complete target storage location with associated storage carriers and adjacent goods being scanned as shown in FIG. 6. Based on the constructed three-dimensional data of the scanning range 100, the computing unit 60 of the system is able to define the target destination position $P_{target}$ to be approached by the load carrying fork 42 for the deposit operation, the position $P_{target}$ corresponding, in the embodiment shown, to a central point in the width direction of the target storage location.

If the defined target position $P_{target}$ differs from the specified actual target position of the load carrying fork 42, the specified actual target position is preferably replaced by the desired target position $P_{target}$. Subsequently, the updated actual target position of the storage location can be approached, allowing the deposit operation to be carried out.

However, the strategy described above assumes that the industrial truck 1 drives past the complete target storage location, allowing the whole target storage location to be scanned. To enable deposit after scanning, the industrial truck 1 must move back a certain distance in the direction opposite to the industrial truck's main direction of travel G so that the load carrying fork 42 can approach the actual target position, which may have been updated. To avoid this, for example, an alternative strategy can be used to support a deposit operation which is illustrated in FIG. 7.

In contrast to the strategy shown in FIG. 6, for example, only one rack support, in this case the vertical support 88 shown in FIG. 7, is scanned and recognized when the target storage location is reached (see scanning range 200). Based on this, the control system of the industrial truck, together with data concerning the dimensions of the target storage bin saved locally or externally (such as in the warehouse management system), can calculate the target destination position $P_{target}$. Although the strategy shown in FIG. 7 has the disadvantage that part of the target storage location cannot be scanned, this disadvantage can be compensated, for example, by using additional sensors, such as a camera, which also detects the storage location and/or the environment near the storage location during the deposit operation.

In addition to the strategies illustrated in FIG. 6 and FIG. 7, a person skilled in the art may also use other strategies for deposit or retrieval operations in conjunction with the industrial truck and/or the method of the present invention, as required.

It should also be noted that, according to the invention, a partially automated industrial truck or a fully automated driverless industrial truck could also be used as an alternative to the manually operated industrial truck shown in FIG. 1. In the case of a fully automated, track-guided industrial truck, for example, the operator's station 12 shown in FIG. 1 can be dispensed with.

The invention claimed is:

1. A system for inspecting a warehouse comprising:
    a laser scanner attached to an industrial truck and adapted to emit laser scanning pulses in directions substantially perpendicular to a main direction of travel of the industrial truck, such that a scanning plane of the laser scanner is substantially perpendicular to the main direction of travel of the industrial truck and encompasses an environment of a warehouse on at least one side of the industrial truck, wherein the laser scanner is further adapted to generate corresponding scan data; and
    a computing unit that is adapted to:
        receive the scan data and additional data comprising at least one of data on an absolute position change of the industrial truck or data on a relative position change of the industrial truck, wherein the additional data indicates movement of the laser scanner in the main direction of travel of the industrial truck; and
        construct three-dimensional data of the environment based on the scan data and the additional data.

2. The system according to claim 1, wherein the computing unit is adapted to receive odometry data of the industrial truck, and wherein the additional data is derived from the odometry data of the industrial truck.

3. The system according to claim 1, wherein the laser scanner is adapted to emit the laser scanning pulses in two horizontal directions perpendicular to the main direction of travel of the industrial truck and a vertical upward direction perpendicular to the main direction of travel of the industrial truck.

4. The system according to claim 1, wherein the computing unit is further adapted to detect individual storage elements from the constructed three-dimensional data of the environment.

5. The system according to claim 1, wherein the computing unit is further adapted to receive data from a warehouse management system.

6. The system according to claim 4, wherein the computing unit is further adapted to check a storage condition based on a comparison of the three-dimensional data of the detected storage elements with corresponding data from a warehouse management system.

7. The system according to claim 4, wherein the computing unit is further adapted to check a storage condition based on a comparison of the three-dimensional data of the individual detected storage elements with predefined reference data.

8. The system according to claim 6, wherein the computing unit is further adapted to document the storage condition or output instructions based on the storage condition.

9. An industrial truck comprising:
a laser scanner attached to the industrial truck and adapted to emit laser scanning pulses in directions substantially perpendicular to a main direction of travel of the industrial truck, such that a scanning plane of the laser scanner is substantially perpendicular to the main direction of travel of the industrial truck and encompasses an environment of a warehouse on at least one side of the industrial truck, wherein the laser scanner is further adapted to generate corresponding scan data; and
a computing unit that is adapted to:
receive the scan data and additional data comprising at least one of data on an absolute position change of the industrial truck or data on a relative position change of the industrial truck, wherein the additional data indicates movement of the laser scanner in the main direction of travel of the industrial truck; and
construct three-dimensional data of the environment based on the scan data and the additional data.

10. The industrial truck according to claim 9, wherein the industrial truck is a track-guided industrial truck.

11. The industrial truck according to claim 9, further comprising a mast, the laser scanner being fixed to an attachment of the industrial truck that is directly or indirectly movably connected to the mast, a height of the laser scanner being adjustable in relation to a driving surface with a work function of the industrial truck.

12. The industrial truck of claim 9, wherein the industrial truck is a high-bay stacker comprising an operator's station with an overhead guard, and wherein the laser scanner is fixedly attached to the overhead guard.

13. A method for inspecting a warehouse, the method comprising:
using a laser scanner attached to an industrial truck to emit laser scanning pulses in directions substantially perpendicular to a main direction of travel of the industrial truck, such that a scanning plane of the laser scanner is substantially perpendicular to the main direction of travel of the industrial truck and encompasses an environment of a warehouse on at least one side of the industrial truck and generating scan data based on the scan;
capturing additional data comprising at least one of data on an absolute position change of the industrial truck or data on a relative position change of the industrial truck, wherein the additional data indicates movement of the laser scanner in the main direction of travel of the industrial truck; and
constructing three-dimensional data of the environment based on the scan data and the additional data.

14. The method of claim 13, further comprising capturing odometry data of the industrial truck, wherein the additional data is derived from the odometry data of the industrial truck.

15. The method of claim 13, further comprising automatically activating a system for inspecting a warehouse when a reference point is detected by the laser scanner.

16. The method of claim 13, further comprising detecting a spatial position of the laser scanner, based on externally input data or reference points detected by the laser scanner, wherein the spatial position of the laser scanner is used in the construction of three-dimensional data of the environment.

17. The method of claim 13, further comprising detecting individual storage elements from the constructed three-dimensional data of the environment.

18. The method of claim 17, further comprising receiving data from a warehouse management system.

19. The method of claim 18, further comprising inspecting a storage condition based on a comparison of the three-dimensional data of the detected storage elements with corresponding data from the warehouse management system.

20. The method of claim 17, further comprising inspecting a storage condition based on a comparison of the three-dimensional data of the detected storage elements with predefined reference data.

21. The method of claim 19, further comprising detecting damage or irregularities of the storage condition.

22. The method of claim 19, further comprising outputting instructions based on the storage condition, wherein the instruction is for re-establishing a proper storage condition.

23. The method of claim 13, wherein the method is carried out during a deposit or retrieval operation.

24. The industrial truck of claim 9, wherein the industrial truck is a high-bay stacker comprising a load carrying apparatus that can be moved laterally back and forth and transverse to a straight-ahead direction of travel of the industrial truck, and wherein the laser scanner is fixedly attached to the load carrying apparatus.

* * * * *